United States Patent [19]

Kuchuk-Yatsenko et al.

[11] Patent Number: 4,940,876
[45] Date of Patent: Jul. 10, 1990

[54] METHOD OF FLASH-BUTT RESISTANCE WELDING OF A BATCH OF LIKE PARTS IN PAIRS

[76] Inventors: Sergei I. Kuchuk-Yatsenko, ulitsa P.Osipenko, I7, kv. I8.; Mikhail V. Bogorsky, ulitsa Ozernaya, 30, kv. I20.; Daniil I. Belyaev, ulitsa Cheshskaya, 4, kv. I4I.; Andrei V. Bondaruk, bulvar Koltsova, I7-G, kv. 26.; Nikolai D. Goronkov, ulitsa Chelyabinskaya, II, kv. 38., all of Kiev, U.S.S.R.

[21] Appl. No.: 368,306
[22] PCT Filed: Sep. 9, 1988
[86] PCT No.: PCT/SU87/00178
§ 371 Date: May 15, 1989
§ 102(e) Date: May 15, 1989
[87] PCT Pub. No.: WO89/02333
PCT Pub. Date: Mar. 23, 1989

[30] Foreign Application Priority Data

Sep. 15, 1987 [SU] U.S.S.R. .................................. 4305525

[51] Int. Cl.$^5$ ............................................. B23K 11/04
[52] U.S. Cl. ..................................... 219/110; 219/100
[58] Field of Search ........................... 219/110, 100, 97

[56] References Cited

U.S. PATENT DOCUMENTS 4,044,219  8/1977  Lebedev et al. .................... 219/100
4,725,707  2/1988  Kuchuk-Yatsenko et al. ...... 219/100

FOREIGN PATENT DOCUMENTS 1042928 of 1983  U.S.S.R. .
1592075 of 1981  United Kingdom .

OTHER PUBLICATIONS

Kuchuk-Yatsenko et al., Kontaktnaya stykovaya svarka nepreryvnym oplvleniem 1976, Naukova dumka, (Kiev), cf. pp. 58–62.

Primary Examiner—Clifford C. Shaw
Attorney, Agent, or Firm—Lilling & Greenspan

[57] ABSTRACT

A method of flash-butt resistance welding of a batch of like parts in pairs consists in that during flashing off of workpieces (1,2) they are brought apart or together depending on the resulting resistance obtained by comparison of the actual resistance between the workpieces (1,2) being welded with the specific short-circuit impedance of the welding circuit, which is determined during the upsetting of the preceeding pair of workpieces (1,2) after the welding current reaches a constant level.

1 Claim, 1 Drawing Sheet

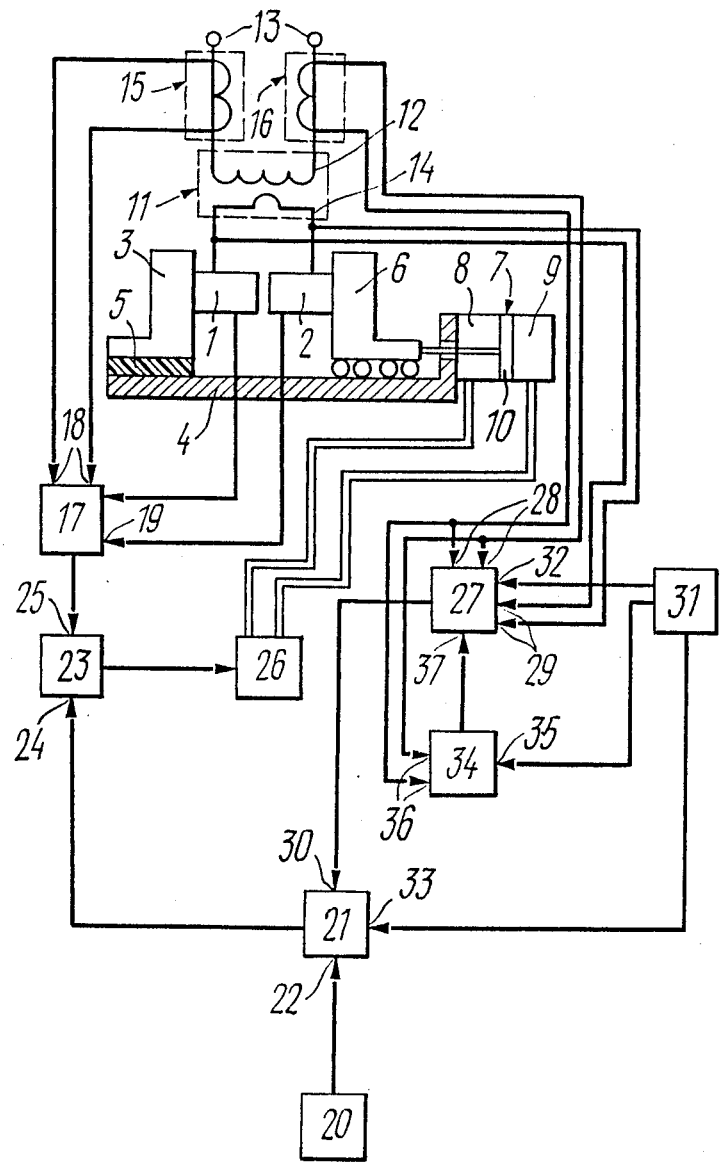

METHOD OF FLASH-BUTT RESISTANCE WELDING OF A BATCH OF LIKE PARTS IN PAIRS

TECHNICAL FIELD

The present invention relates to welding and in particular to methods of flash-butt resistance welding of a batch of like parts in pairs, primarily in welding large cross-sections. The proposed method may be used in welding of a batch of parts of one size.

One of the factors influencing effectiveness of heating of parts in flash-butt resistance welding is stability of a flasing stage. The flashing is regarded to be stable when end faces of parts are not shorted and current flow over a welding circuit is continuous.

In butt resistance welding of parts having large cross-sections it is generally impossible to obtain stable flashing with a fixed program for changing the feed rate of one of the parts being welded.

BACKGROUND ART

There is known a method of flash-butt resistance welding (S.I. Kuchuk-Yatsenko et al: "Kontaktnaya stykovaya svarka neprerivnym oplavleniem" 1976, Naukova dumka, Kiev, pp 59-62) in which the value of welding current is monitored and the speed of drawing together parts to be welded is changed depending on said value. With such a method, welded parts are not shorted for a long time.

There is also known a method of flash-butt resistance welding (SU, A, 1,065,121), wherein resistance between parts being welded is measured in the course of flashing, the current ratio of the resistance between parts being welded to short-circuit impedance of a welding circuit is monitored and, depending on the value of said ratio, the welded parts are brought together or moved apart.

The foregoing method allows increasing efficiency of a welding process due to a shorter time required to heat end faces of parts to a sufficient level. The above advantage is attributable to the fact that, in the known method, interruption of welding current flow and occurrence of shorts in flashing are made less probable by maintaining resistance between welded parts within predetermined limits.

However, in the afore-mentioned prior-art method no account is taken of a change in short-circuit impedance of a welding circuit in welding a batch of parts. In the course of utilization of a welding circuit its short-circuit impedance varies. A difference between the actual value of short-circuit impedance of a welding circuit and its rating may be as great as $20$ to $30.10^{-6}\Omega$. Variations of said value may be influenced by a number of factors.

Firstly, gripping jaws and current buses of a welding circuit are heated in the course of welding, a feature substantially increasing short-circuit impedance of a welding circuit.

Secondly, as the welding operation is conducted, metal splashes stick to various parts of a welding circuit in an area encompassed by the welding circuit and to the components of said circuit, due to which its short-circuit impedance is also increased.

Thirdly, the magnitude of short-circuit impedance of a welding circuit is influenced by variations of contact resistance of current-carrying parts of said welding circuit.

Thus, the numerical value of short-circuit impedance of a welding circuit, which is used in process control, should be monitored and accounted for so that the flashing process is highly effective. In the foregoing method, no account is taken of this variation and the magnitude used is either the rating or the value of short-circuit impedance of a welding circuit obtained in maintenance operations. As a result, flashing stability is impaired and effectiveness of heating of parts is appreciably reduced. The welding time is increased, accordingly.

DISCLOSURE OF THE INVENTION

This invention is to provide a method of flashbutt resistance welding of a batch of like parts in pairs, which is to take into account variations of electrical parameters of the welding circuit during its operation and to offer an opportunity to correct the welding parameters for a batch of workpieces in order to increase the stability of the flashing stage. This is to make the heating of workpieces more effective and reduce the welding time.

There is provided a method of flash-butt resistance welding of a batch of like parts in pairs, comprising the steps of placing a pair of parts in a welding machine, forming a welding circuit, setting an appropriate value of short-circuit impedance of the welding circuit for the first pair of parts to be welded in the batch, connecting the welding circuit to a power supply and flashing off said pair of parts being welded, continuously monitoring resistance between welded parts while flashing off the first and subsequent pairs of welded parts, comparing for the first pair of welded parts the current value of resistance between said welded parts with the initially set shortcircuit impedance of said welding circuit to maintain the resistance between said welded parts within required limits, drawing together or moving apart the first pair of said welded parts in the course of flashing, depending on the resultant resistance value obtained by comparing the current value of resistance between said welded parts with the original short-circuit impedance of the welding circuit, and upsetting the welded parts, which, according to the invention, additionally comprises the steps of monitoring the value of welding current in the course of upsetting in welding each pair of parts and determining a more exact value of the short-circuit impedance of the welding circuit as soon as the welding current reaches a constant value by using said current value and the magnitude of voltage measured simultaneously with said welding current, comparing in welding each subsequent pair of said welded parts the current value of the resistance between the parts being welded with a more exact value of the short-circuit impedance of the welding circuit in upsetting each preceding pair of said parts, drawing together and moving apart the parts being welded in flashing off each pair of said welded parts, depending on the resultant resistance value obtained in comparing the current value of the resistance between the welded parts with said more exact value of the short-circuit impedance of the welding circuit, which was obtained in each preceding welding cycle.

The invention permits increasing the capacity of welding equipment and extending welding capabilities owing to the fact that, with the proposed method, parts having larger cross-sections may be welded, which is an apparent advantage over the prior art.

BRIEF DESCRIPTION OF DRAWINGS

The invention will now be described further with reference to a specific embodiment thereof, taken in conjunction with the accompanying drawing which is a functional diagram of a device for accomplishing the method of flash-butt resistance welding of a batch of like parts in pairs according to the invention.

BEST MODE FOR CARRYING OUT THE INVENTION

The proposed method essentially consists in that, in the course of flashing, parts being welded are brought together or moved apart depending on the resultant resistance value obtained in comparing the current value of total resistance of elementary contacts on end faces of welded parts with a more accurate value of short-circuit impedance of a welding circuit. Inasmuch as the short-circuit impedance of the welding circuit changes in operation and the difference between the actual short-circuit impedance and its rating may be as great as 20 to $30.10^{-6}\Omega$, it is advantageous to determine the short-circuit impedance of the welding circuit in welding the preceding pair of said parts in the course of upsetting after the welding current reaches a constant value by the formula $$Z = \frac{U}{I},$$

where I is welding current in upsettig after attaining a constant value and U is welding voltage in upsetting, measured simultaneously with the welding current.

With such techniques, account is taken of changes in the state of said welding circuit during operation. Due consideration is given to factors affecting shortcircuit impedance of the welding circuit, more specifically, to heating of gripping jaws and current buses causing an increase in the short-circuit impedance of said welding circuit; metal splashes stuck on machine parts in an area encompassed by said welding circuit and on parts of said circuit whereby the short-circuit impedance of said welding circuit is also increased; and changes in contact resistance of current-carrying parts of the welding circuit.

In welding each butt in a given batch of parts, there is found a more accurate value of short-circuit impedance of the welding circuit and said more accurate value is accounted for in controlling the process of welding the next pair of parts. Thus, flashing stability is increased, which saves power and reduces welding time.

Referring to the accompanying drawing a device for carrying out the proposed method of flash-butt resistance welding of a batch of like parts in pairs comprises parts 1, 2 to be welded a column 3 rigidly secured to a frame 4 through a spacer 5, and a column 6 secured to the frame 4 in a manner allowing its displacement along the longitudinal axis of the parts 1 and 2 to be welded.

The column 3 and 6 hold the parts 1 and 2 being welded and accommodate elements of a welding circuit.

The device in compliance with the invention also comprises a flash-off and upsed hydraulic cylinder 7 attached to the frame 4 and having cavities 8 and 9, a piston 10 of said cylinder being rigidly secured to the column 6. The flash-off and upset hydraulic cylinder 7 is designed to bring together and move apart the parts 1 and 2 being welded.

The proposed device also includes a welding transformer 11 whose primary winding 12 is connected to a power supply 13, while its secondary winding 14 is connected to the parts 1, 2 being welded and forms a welding circuit in conjunction with the parts 1, 2.

The frame 4 accommodates elements of a welding machine. The dielectric spacer 5 prevents a short between the welding circuit and the frame 4.

The transformer 11 converts voltage furnished by the power supply 13 into welding voltage.

The device forming the subject of the invention also comprises current transformers 15 and 16 disposed on the primary winding 12 of the welding transformer 11. The current transformer 15 is used to monitor welding current flowing through the welded parts 1 and 2 during flash-off. The current transformer 16 is designed to monitor welding current flowing through the welded parts 1 and 2 during upset.

Furthermore, the proposed device includes a divider unit 17 designed to generate a signal proportional to the quotient of the voltage value between the parts being welded by welding current in flash-off, inputs 18 of said divider unit being connected to the current transformer 15, while its inputs 19 are connected to the parts 1 and 2 being welded.

The device for accomplishing the proposed method of flash-butt resistance welding of a batch of like parts in pairs also incorporates a unit 20 for manual input of data on the value of short-circuit impedance of the welding circuit, said unit being utilized for setting the short-circuit impedance in welding a first pair of the parts 1, 2 in the given batch, a memory unit 21 to store information on short-circuit impedance of said welding circuit, an input 22 of said memory unit being connected to the output of the unit 20, a comparator unit 23 used to compare a signal proportional to the short-circuit impedance of the welding circuit with a signal proportional to the current value of resistance between the welded parts 1, 2 in flashing operation, an input 24 of said comparator being connected to the output of the memory unit 21, while its input 25 is connected to the output of the divider unit 17, an electrohydraulic amplifier 26 designed to control the flow of working fluid in the hydraulic system of the welding machine in proportion to the value of an input control electrical signal and, consequently, to enable movement of the column 6, the outputs of said amplifier being connected with the cavities 8 and 9 of the hydraulic cylinder 7, whereas its input is connected to the output of the comparator unit 23, a divider unit 27 designed to determine the quotient of the voltage across the welded parts by welding current in upset operation, that is, to develop a signal proportional to a more accurate value of the short-circuit impedance of the welding circuit, inputs 28 of said divider unit being connected to the current transformer 16, its inputs 29 being connected to the secondary winding 14 of the welding transformer 11, while its output is connected to an input 30 of the memory unit 21, a command unit 31 representing a relay and used to transmit commands to the divider unit 27 and to the memory unit 21, the first output of said command unit being connected to an input 32 of the divider unit 27, the second input thereof being connected to an input 33 of the memory unit 21, a differentiating unit 34 designed to determine a time derivative of welding current in upset operation and to transmit an enabling command to the divider ulnit 27 when the above derivative is zero, an input 35 of said differentiating unit being connected to the third output of the command unit 31, its inputs 36 being connected to the current transformer 16, while its output is connected to an input 37 of the divider unit 27.

The units 17, 20, 21, 23, 27, 31, 34 and the electrohydraulic amplifier 26 employ known circuitry commonly referred to in relevant publications.

The device for accomplishing the proposed method of flash-butt resistance welding of a batch of like part in pairs operates in the following manner.

Before welding a given batch of parts 1, 2, the manual input unit 20 is used to introduce, prior to flash-off, the value of short-circuit impedance of the welding circuit in the memory unit 21 via its input 22 for the first pair of the parts 1, 2 to be welded in the given batch. Said value may be the rated shortcircuit impedance of the welding circuit or one obtained in maintenance of the welding machine.

When the welding begins, a signal to draw together the parts 1 and 2 to be welded is fed from the memory unit 21 via the comparator unit 23 to the input of the electrohydraulic amplifier 26. Simultaneously, welding voltage is applied to the parts 1 and 2 through the secondary winding 14 of the welding transformer 11. Pressure oil is supplied from the electrohydraulic amplifier 26 into the cavity 9 of the flash-off and upset hydraulic cylinder 7 and the parts 1 and 2 being welded are brought closer to each other.

As the end faces of the parts 1 and 2 come into contact, welding current starts flowing over the welding circuit. The current transformer, 15 furnishes at its output a signal porportional to the value of said welding current, which is fed to the inputs 18 of the divider unit 17. The voltage from the parts 1 and 2 being welded is applied to the inputs 19 of the divider unit 17.

The divider unit 17 computes the signal proportional to the quotient of the voltage in the welded parts 1 and 2 by the welding current in flashoff, that is, proportional to total resistance of elementary contacts on end faces of the parts 1 and 2 being welded. Said signal is applied to the input 25 of the comparator unit 23 and, at the same time, the input 24 of the comparator unit 23 receives a signal proportional to the original value of shortcircuit impedance of the welding circuit.

The comparator unit 23 computes the difference between the signal proportional to the original value of short-circuit impedance of the welding circuit and the signal proportional to the current value of total resistance of elementary contacts on end faces of the parts 1 and 2 being welded. Depending on the magnitude and sign of the resultant signal proportional to the resistance value obtained in comparing the current value of total resistance of said elementary contacts on the end faces of the welded parts 1, 2 with the original value of the short-circuit impedance of the welding circuit, the comparator unit 23 generates a control signal which is fed to the input of the electrohydraulic amplifier 26.

The electrohydraulic amplifier 26 controls the flow of pressure oil in response to the control signal coming from the comparator unit 23, the welded parts 1 and 2 being drawn together or moved apart at a speed proportional to the control signal value, depending on the sign of the control signal. Such a process occurs throughout the flashing stage involving the parts 1 and 2.

At the moment the flashing begins, the following commands are fed from the outputs of the command unit 31:

(1) command to the input 33 of the memory unit 21. Upon receipt of this command, the information on the original value of short-circuit impedance of the welding circuit is erased from the memory unit 21;
(2) command to the input 35 of the differentiating unit 34. Upon receipt of this command, the differentiating unit 34 is turned on;
(3) command to the input 32 of the divider unit 27.

During the upset operation, a signal proportional to the value of welding current in upsetting is fed from the current transformer 16 to the inputs 28 of the divider unit 27. At the same time, the inputs 29 of the divider unit 27 receive voltage from the secondary winding 14 of the welding transformer 11.

From the current transformer 16 the signal proportional to the value of welding current in upsetting is also fed to the inputs 36 of the differentiating unit 34. The differentiating unit 34 computes a time derivative of welding current in upsetting. When said time derivative equals zero, which indicatest that the welding current has reached a constant value, the command to turn on the divider unit 27 is fed from the output of the differentiating unit 34 to the input 37 of the divider unit 27.

When the command from the command unit 31 comes to the input 32 of the divider unit 27 and the input 37 receives a corresponding command from the differentiating unit 34, the divider unit 27 is turned on to compute a more accurate value of short-circuit impedance of the welding circuit by finding the quotient of the monitored voltage measured simultaneously with the monitored current by the value of said monitored current.

From the divider unit 27 the signal proportional to said more accurate value of shortcircuit impedance of the welding circuit is applied to the input 30 of the memory unit 21, wherein it is stored. This completes the given welding cycle. In flashing of parts during the next welding cycle, account is taken of said more accurate value of short-circuit impedance of the welding circuit, which reflects changes in the state of the welding circuit under the action of the above factors. In each subsequent welding cycle with other parts of the same batch, the flashing process is controlled using said more accurate value of short-circuit impedance of the welding circuit, measured in each preceding welding cycle.

Thus, with the proposed method of flash-butt resistance welding of a batch of like parts in pairs, account may be taken of changes in the electrical parameter of said welding circuit, more specifically, of variations of short-circuit impedance of the welding circuit occurring in operation. Welding parameters may be adjusted to increase stability in flashing the parts 1 and 2 being welded. This makes more effective the heating of welded parts in flash-off due to the fact the flow of welding current is continuous and said welded parts are free from shorts, another advantage being a shorter welding time.

Given below is an example illustrating use of the methodd according to the invention.

A butt resistance welding machine was used to check effectivenes of the proposed method of flash-butt resistance welding of a batch of like parts in pairs.

Two batches of low-carbon round billets, 90 mm dia, were welded.

The welding conditions were as follows: secondary voltage of welding transformer —7 to 8 V; flashing allowance—15 mm; upsetting allowance —100 mm.

The short-circuit impedance of the welding circuit measured during the last maintenance procedure was $90 \cdot 10^{-6} \Omega$.

The first batch of specimens was welded by the known method (prototype of the present invention).

The parts welded were brought together in flashing until the total resistance of elementary contacts on end faces of said parts reached $40 10^{-6} \Omega$ whereupon said parts were moved apart. While said parts were moved apart, the total resistance on the end faces of the parts welded increased. As it reached $130 \cdot 10^{-6} \Omega$, said parts were again drawn together.

The parts welded were brought together until the total resistance of said elementary contacts on the end faces of said parts amounted to 0.45 of the short-circuit impedance of the welding circuit whereupon said parts were moved apart until the total resistance of the elementary contacts on the end faces of the parts welded amounted to 1.45 of the short-circuit impedance of the welding circuit, measured during maintenance thereof.

In this case the welding time was, on the average, 80 seconds in welding first parts in the given batch. The recording of welding current and voltage showed that, in the middle of the production process, short interruptions were observed in the flow of welding current, primarily at the intial welding stage. The welding time increased to 85–95 seconds. The quality of welded joints was still satisfactory.

The second batch of specimens was welded by the method in compliance with the present invention. In welding the first pair of the parts 1, 2 in the given batch, entered in the manual input unit 20 was the value of short-circuit impedance of the welding circuit, determined during maintenance thereof. Said value was $90 \cdot 10^{-6} \Omega$.

The parts 1 and 2 welded were brought together in flashing until the total resistance of elementary contacts on end faces of the welded parts 1, 2 reached $40 \cdot 10^{-6} \Omega$ whereupon the parts 1 and 2 were drawn apart. While said parts were drawn apart, the total resistance of said elementary contacts on the end faces of the parts 1 and 2 beig welded increased. As it reached $130 \cdot 10^{-6} \Omega$, the parts 1 and 2 were again drawn together.

The short-circuit impedance of the welding circuit was measured in the course of upsetting.

In welding of subsequent pairs of the parts 1 and 2 in the second batch, the parts 1 and 2 were moved apart when the total resistance of the elementary contacts on the end faces of the welded parts 1 and 2 reached a value equal to the product of the more accurate value of short-circuit impedance of the welding circuit determined in upsetting the previous pair of the parts 1 and 2 into a factor of 0.45. The parts 1 and 2 were brought together when the total resistance of the elementary contacts on the end faces of the welded parts 1 and 2 reached a value equal to the product of the more accurate value of short-circuit impedance of the welding circuit determined in upsetting the previous pair of the parts 1 and 2 into a factor of 1.45.

The recording of flashing parameters showed that, in welding by the use of the proposed method, the flow of welding current weas not interrupted. In operation of the welding machine, the short-circuit impedance of the welding circuit increased to $115 \cdot 10^{-6} \Omega$.

The average time for parts of the second batch was 75 to 80 seconds. It showed no increase in operation of the welding machine. The quality of welded joints was satisfactory.

The proposed method of flash-butt resistance welding of a batch of like parts in pairs permits increasing flashing stability, an advantage making it possible to decrease welding time by 10%, save power and generally improve energy characteristics of a welding process.

INDUSTRIAL APPLICABILITY

This invention should advisably be employed for welding of rails, large-size tubes, and all types of rolled products in general when their cross-section is large.

We claim:

1. A method of flash-butt resistance welding of a batch of like workpieces in pairs comprising the steps of placing a pair of workpieces (1,2) into a welding machine to form a welding circuit, settig an appropriate value of short-circuit impedance of the welding circuit for a first pair of workpieces (1,2) connecting the welding circuit to a power supply, and flashing off said pair of workpieces, while continuously monitoring the resistance between welded workpieces (1,2) during flashing of the first and subsequent pairs of welded workpieces (1,2), comparing the actual resistance between welded workpieces (1,2) for the first pair of welded workpieces (1,2) with the initially set short-circuit impedance of the welding circuit, and, in order to maintain the resistance between the wielded workpieces (1,2) on a desired level, drawing together or moving apart the first pair of welded workpieces (1,2) as a function of the resultig resistance obtained through the comparison of the actual resistance between the welded workpieces (1,2) with the initially set short-circuit impedance of the welding circuit, and, finally, upsetting the workpieces (1,2) being welded together, characterized by that the method additionally comprises the steps of monitoring the welding current during upsetting process of each pair of workpieces and, when the welding current reaches a constant level, determining a more exact short-circuit impedance of the welding circuit through the use of said current and voltage measured simultaneously with said welding current, and comparing, during welding of each sunsequent pair of workpieces (1,2), the actual resistance between workpieces (1,2) with the short-circuit impedance of the welding circuit, which had been specified during the flashing off of each preceding pair of workpieces (1,2), and drawing together and moving apart said workpieces (1,2) during flashing off of each pair of such workers (1,2) as a function of the resulting resistance obtained through the comparison of the actual resistance between the workpieces (1,2) being welded and the short-circuit impedance of the welding circuit, which is specified during the weldinrg of each preceeding pair of workpieces (1,2).

* * * * *